No. 804,203. PATENTED NOV. 14, 1905.
G. W. BROWN.
LUBRICATOR.
APPLICATION FILED DEC. 1, 1904.

UNITED STATES PATENT OFFICE.

GEORGE W. BROWN, OF BOSTON, MASSACHUSETTS.

LUBRICATOR.

No. 804,203.  Specification of Letters Patent.  Patented Nov. 14, 1905.

Application filed December 1, 1904. Serial No. 234,982.

*To all whom it may concern:*

Be it known that I, GEORGE W. BROWN, a citizen of the United States, residing at Boston, county of Suffolk, and State of Massachusetts, have invented an Improvement in Lubricators, of which the following description, in connection with the accompanying drawings, is a specification, like figures on the drawings representing like parts.

This invention relates to lubricating devices for bearings, and has for its object to provide a novel device of this character in which oil will be supplied to the bearing-surfaces so long as they need lubrication and the supply will cease when the rotating part of the bearing is at rest.

A device embodying my invention comprises an oil-receptacle, a supply-chamber, which is supplied with oil from the oil-receptacle, said chamber being connected to the bearing-surfaces by an oil-duct, and a free valve, which is unconfined in its movement, for normally closing said duct. The construction is such that so long as the rotating part of the bearing remains at rest the valve closes said duct and prevents the flow of oil from the supply-chamber to the bearing-surfaces; but as soon as the axle or shaft of the bearing begins rotation the vibration caused thereby gives sufficient movement to the valve to dislodge it momentarily and at short intervals of time from its seat, thereby allowing a sufficient quantity of oil to flow through the duct to lubricate the bearing-surfaces.

Figure 1:
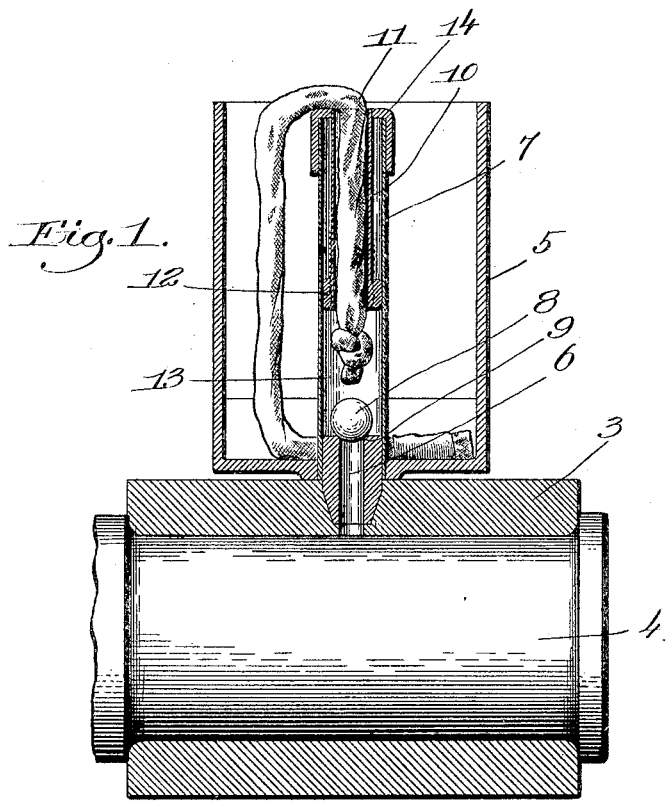
Figure 2:
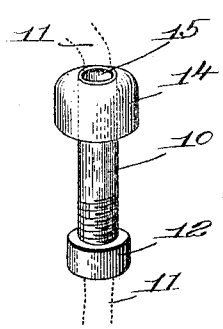

In the drawings, Figure 1 is a vertical section through a lubricator embodying one form of my invention, and Fig. 2 is a detail hereinafter referred to.

3 represents any suitable bearing having an axle or shaft 4 rotating therein which it is desired to lubricate.

5 designates an oil-receptacle mounted on the bearing and provided with an oil-duct 6, which leads to the axle or shaft to be lubricated. Situated within the oil-receptacle 5 is a supply-tube 7, which communicates at its lower end with the duct 6 and which is supplied with oil from the oil-receptacle by some suitable means, as will be hereinafter described. The duct 6 is normally closed by a valve 8, which valve is free and unconfined. The form of valve I prefer to employ is a ball-valve, which normally rests on the valve-seat 9 at the top of the duct 6, and thereby closes said duct.

10 designates a wick-tube containing a suitable wick 11. The wick-tube is adapted to be inserted into the supply-tube 7 from its upper end, and said wick-tube is provided at its lower end with a plunger or head 12, which fits the interior of the supply-tube and makes a tight joint therewith. The wick-tube is considerably shorter than the supply-tube, so that when said wick-tube is in place there exists within the supply-tube and beneath the plunger 12 a chamber 13, which I will hereinafter refer to as a "supply-chamber." I prefer to provide the upper end of the wick-tube 10 with a cap 14, which is adapted to fit over the upper end of said supply-tube when the wick-tube is in place, said cap having an opening 15 therethrough, through which the wick 11 passes. The wick extends through the wick-tube, and one end occupies the supply-chamber 13, while the other end, which is much longer, occupies the oil-receptacle 5.

The oil-receptacle 5 is to be filled or substantially filled with oil. This oil is slowly fed into the supply-chamber 13 by means of the capillary attraction in the wick 11. So long as the axle remains at rest the valve 8 will close the duct 6, and therefore the oil will accumulate in the supply-chamber 13; but no oil will be delivered to the axle, because the duct 6 is closed by the valve 8. As soon as the axle or shaft begins its rotation the vibration thereof will be transmitted to the valve 8. The vibration of said valve causes it to leave its seat momentarily, thereby permitting a slight quantity of oil to flow down the duct 6 to the bearing-surfaces. It will be observed that so long as the axle is rotating and the vibrations continue oil will be thus supplied in small quantities to the bearing-surfaces. As soon, however, as the rotation of the axle ceases and no further lubricating is necessary the valve 8 will assume its closed position by gravity and will cut off the flow of oil to the bearing-surfaces. The wick 11, however, continues to supply oil to the supply-chamber 13, even when the bearing is at rest, until said chamber is filled. By means of my device, therefore, a supply of oil is always maintained in the supply-chamber 13, so that the instant the axle begins rotation and the valve 8 is forced from its seat oil will be supplied to the bearing-surfaces. The wick 11 acts as a regulator to control the amount of oil which is delivered while the axle is rotating and also serves as a means to fill the depleted supply-chamber 13 while the axle is at rest.

I regard as the important features of my invention the supply-chamber 13, which is supplied with oil by means of the wick 11, and the free gravity-actuated valve controlling the flow of oil from said supply-chamber to the bearing-surfaces.

The plunger 12 is shown as adjustably mounted on the wick-tube, so that it can be adjusted up and down thereon, this being conveniently accomplished by screw-threading the plunger to said wick-tube. This construction furnishes means whereby the size of the supply-chamber 13 may be increased or diminished to correspond with the size of the oil-cup and bearing with which the device is to be used.

Although I have herein shown one form of my invention, I do not wish to be limited to the construction and arrangement illustrated, as they may be varied in many ways without departing from the invention.

Having fully described my invention, what I claim as new, and desire to secure by Letters Patent, is—

1. In a lubricator, a supply-chamber having a duct leading to the bearing-surfaces, a free, unconfined valve controlling the flow of oil through said duct and means to adjust and vary the size of the supply-chamber.

2. In a lubricator, an oil-receptacle, a supply-chamber within said receptacle, said supply-chamber having a duct leading to the bearing-surfaces and means to deliver oil from the oil-receptacle to the supply-chamber, a gravity-actuated valve controlling the flow through said duct and means to adjust and vary the size of the supply-chamber.

3. In a lubricator, an oil-receptacle, a supply-tube therewithin, the interior of said supply-tube communicating with the bearing-surfaces by an oil-duct, means to supply oil from the oil-receptacle to the supply-tube, and a gravitating valve within said supply-tube normally closing said duct but being adapted to be unseated by vibration of the bearing.

4. In a lubricator, an oil-receptacle, a supply-tube within said oil-receptacle, a wick-tube within the supply-tube, said wick-tube being shaped at one end to fit the supply-tube and forming between said end and the bottom of the supply-tube a supply-chamber, a wick to deliver oil from the oil-receptacle to the supply-chamber, and a free, unconfined ball-valve controlling the flow of oil from the supply-chamber to the surface to be lubricated.

5. In a lubricator, a supply-tube combined with a wick-tube and an adjustable plunger within the wick-tube whereby the change of position of the plunger determines the capacity of the supply-tube.

In testimony whereof I have signed my name to this specification in the presence of two subscribing witnesses.

G. W. BROWN.

Witnesses:
　Louis C. Smith,
　Bertha F. Heuser.